United States Patent

Colling et al.

[15] 3,702,424
[45] Nov. 7, 1972

[54] ELECTRONIC PUSH BUTTON SEQUENCER

[72] Inventors: Ronald L. Colling, Millington; Myron U. Trenne, Flint, both of Mich.

[73] Assignee: General Electric Corporation, Detroit, Mich.

[22] Filed: May 20, 1971

[21] Appl. No.: 145,274

[52] U.S. Cl. ................... 317/140, 317/154, 317/157
[51] Int. Cl. ............................................ H01h 47/04
[58] Field of Search ..................... 317/140, 154, 157

[56] References Cited

UNITED STATES PATENTS 3,351,819   11/1967   Biggam ................. 317/154 X

*Primary Examiner*—J. D. Miller
*Assistant Examiner*—Harry E. Moose, Jr.
*Attorney*—C. R. Meland and Tim G. Jagodzinski

[57] ABSTRACT

A push button sequencer in which a latching relay is energized and latched, in response to the actuation of a push button, to connect a load to a power source. Upon the release of the push button, a control circuit senses the energization of the latching relay and the release of the push button to energize a second relay which connects the output of the push button to a circuit for deenergizing the latching relay. A subsequent actuation of the push button supplies a signal to the circuit to deenergize the latching relay. The control circuit senses the release of the push button and the deenergization of the latching relay to deenergize the second relay. Upon the deenergization of the latching relay, the load is disconnected from the power source and the circuit is returned to its original condition such that the next actuation of the push button will again energize and latch the latching relay to supply power to the load.

2 Claims, 1 Drawing Figure

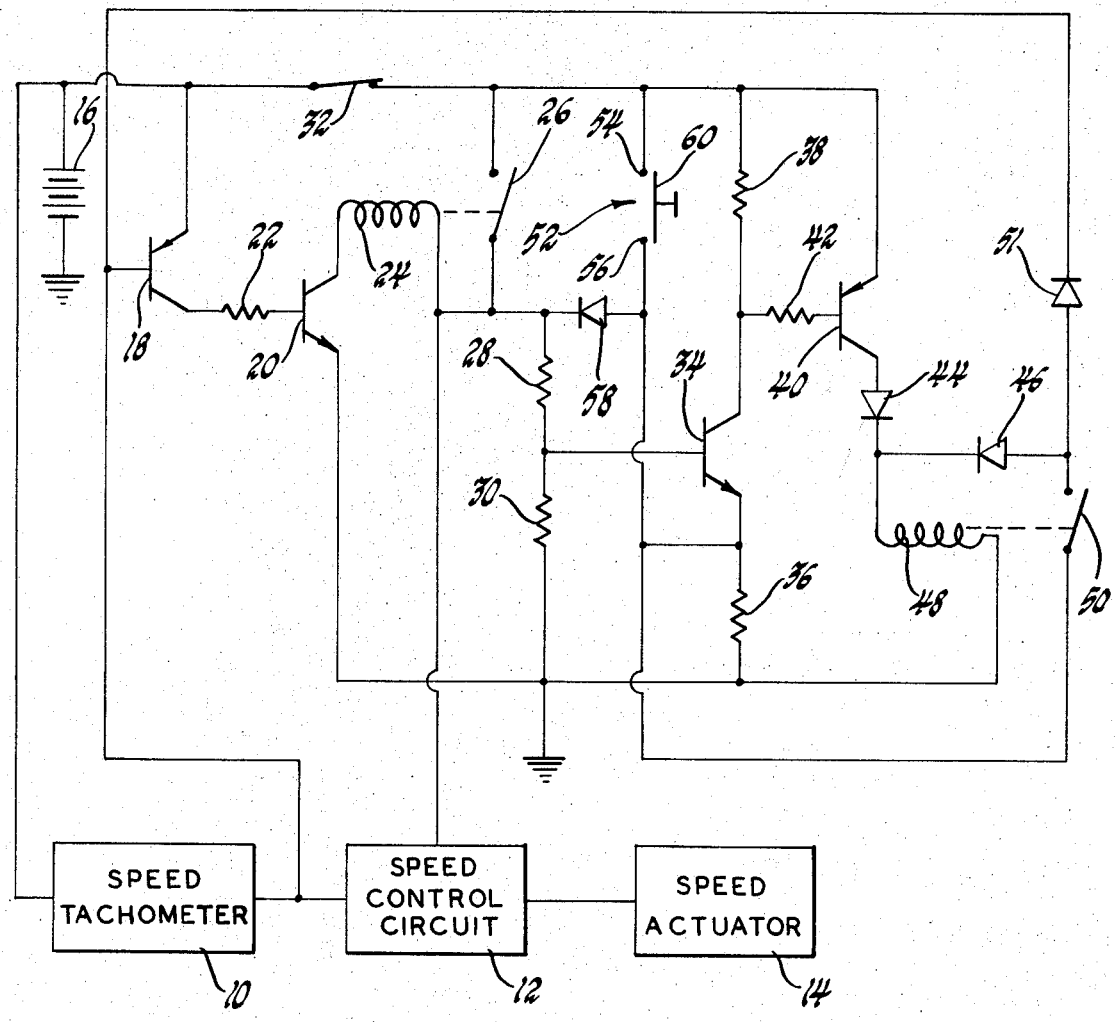

ELECTRONIC PUSH BUTTON SEQUENCER

This invention relates to an electronic push button sequencer. More specifically, this invention relates to an electronic circuit which alternately connects and disconnects a load from a power source upon repeated actuations of a push button.

Mechanical push button sequencers are known and are usually comprised of a ratcheting mechanism which alternately connects and disconnects a load from the power source with each actuation of the push button. This is accomplished by the rotation of the ratcheting mechanism upon the depression of the push button.

It is the object of this invention to provide an electronic push button sequencer which eliminates the ratcheting mechanism of the mechanical push button sequencers.

The object of this invention is accomplished by using a latching circuit which is energized and latched to supply power to a load upon the depression of a push button and a circuit which is armed upon the energization of the latching circuit and the release of the push button. Arming of the circuit connects the push button to another circuit for deenergizing the latching circuit such that the following actuation of the push button deenergizes the latching circuit to disconnect the load from the power source.

The invention may be best understood by reference to the following description of a preferred embodiment and the single FIGURE drawing which is a schematic diagram of the preferred embodiment of this invention.

The preferred embodiment is hereinafter described with reference to the energization and deenergization of a vehicle speed control circuit for illustration purposes only. It is understood that the electronic push button sequencer is not limited thereto, but may be used in any application where it is desired to selectively connect and disconnect two circuit elements.

Referring to the drawing, a system for controlling the speed of a vehicle is comprised of a speed tachometer 10, a speed control circuit 12 and a speed actuator 14. The speed tachometer 10 is connected to and receives operating power form a DC power source 16, which may be the vehicle battery, and is of a variety well known in the art in which its direct voltage output is inversely proportional to vehicle speed, the output being equal to the output potential of the DC power source 16 when the vehicle speed is zero. The output of the speed tachometer 10 is supplied to the speed control circuit 12 which, when supplied with operating power, compares the actual speed of the vehicle with a desired speed and supplies a control signal to the speed actuator 14 so as to maintain the speed of the vehicle at the desired speed. The speed tachometer 10, the speed control circuit 12 and the speed actuator 14 are of the form well known in the art of speed controls and, consequently, will not be described in greater detail.

The output of the speed tachometer 10 is connected to the base electrode of a PNP transistor 18 whose emitter electrode is connected to the positive terminal of the DC power source 16 and whose collector electrode is connected to the base electrode of an NPN transistor 20 through a resistor 22. The emitter electrode of the transistor 20 is connected to ground and its collector electrode is connected to a relay coil 24 which controls a set of normally open contacts 26. One side of the set of normally open contacts 26 is connected to the remaining side of the relay coil 24, the speed control circuit 12 and ground through a resistor 28 and a resistor 30. The remaining side of the set of normally open contacts 26 is connected to the positive terminal of the DC power source 16 through a brake switch 32. The brake switch 32 is normally closed and is adapted to be opened upon the actuation of the vehicle brakes.

The relay coil 24 and the set of normally open contacts 26 form a latching circuit and the transistors 18 and 20 with their associated circuitry form an enabling or inhibiting circuit for the relay coil 24. When the transistors 18 and 20 are biased into their conduction regions, the relay 24 is enabled and is energized to close the set of normally open contacts 26 when power is supplied thereto. The relay coil is thereafter latched by power supplied thereto from the DC power source 16 through the set of normally open contacts 26. When the transistors 18 and 20 are biased into their nonconduction regions, the relay coil 24 is inhibited and cannot be energized or remain energized.

The junction between the resistor 28 and the resistor 30 is connected to the base electrode of an NPN transistor 34 whose emitter electrode is connected to ground through a resistor 36 and whose collector electrode is connected to the positive terminal of the DC power source 16 through a resistor 38 and the brake switch 32. The collector electrode of the transistor 34 is also connected to the base of a PNP transistor 40 through a resistor 42. The emitter electrode of the transistor 40 is connected to the positive terminal of the DC power source 16 through the brake switch 32 and its collector electrode is connected to the anode of a diode 44. The cathode of the diode 44 is connected to the cathode of a diode 46 and to ground through a relay coil 48. The relay coil 48 controls a set of normally open contacts 50 having one terminal connected to the anode of the diode 46 and to the anode of a diode 51. The cathode of the diode 51 is connected to the base electrode of the transistor 18.

A push button switch 52 has a terminal 54 connected to the positive terminal of the DC power source 16 through the brake switch 32 and a terminal 56 connected to the anode of a diode 58, the emitter electrode of the transistor 34 and the remaining terminal of the set of normally open contacts 50. The cathode of the diode 58 is connected to the junction between the relay coil 24 and the set of normally open contacts 26. The push button switch 52 also includes a contactor 60 having a neutral position as shown and an actuated position at which the contactor 60 engages the terminals 54 and 56 to provide an electrical connection therebetween. The push button switch 52 functions as a pulse generator for supplying a pulse of power at its terminal 56 when the contactor 60 is actuated.

The transistors 34 and 40 with their associated circuitry serve as a gate to energize the relay coil 48 and close the set of normally open contacts 50 to connect the terminal 56 to the base electrode of the transistor 18 as a function of the condition of the relay coil 24 and the position of the contactor 60 in a manner to be hereinafter described.

When the vehicle speed is zero, the output of the speed tachometer 10 is a potential equal to the output potential DC power source 16. Therefore, the transistor 18 and consequently the transistor 20 are biased into nonconduction. If the contactor 60 is moved to its actuated position when this condition exists, the potential from the DC power source 16, which is applied to the relay coil 24 through the diode 58, cannot energize the relay coil 24 since it is inhibited by the transistors 18 and 20. Therefore, actuation of the contactor 60 when the transistors 18 and 20 are biased into nonconduction is ineffective to energize the relay coil 24.

As the vehicle speed increases, the output of the speed tachometer decreases until a speed is reached at which the transistor 18 and consequently the transistor 20 are biased into conduction to enable the relay coil 24. This speed is the minimum speed at which the vehicle can be controlled. When the vehicle is above the minimum speed, actuation of the contactor 60 completes a circuit from the DC power source 16 through the normally closed brake switch 32, the terminals 54 and 56, the diode 58, the relay coil 24 and the transistor 20 to ground. The relay coil 24 is therefore energized to close the set of normally open contacts 26. Closure of the normally open contacts 26 latches the relay coil 24 as previously described and also connects the DC power source to the speed control circuit 12. The speed control circuit 12 is therefore energized to supply an output to the speed actuator 14 to maintain the speed of the vehicle.

Upon the closure of the normally open contacts 26, a potential as determined by the voltage divider comprised of the resistors 28 and 30 is applied to the base electrode of the transistor 34. While the contactor 60 is in its actuated position, the positive terminal of the DC power source 16 is connected to the emitter electrode of the transistor 34. Consequently, the transistor 34 is biased into nonconduction when the relay contacts 26 are closed and the contactor 60 is in its actuated position. When the transistor 34 is biased into nonconduction, the transistor 40 is also biased into nonconduction resulting in the relay coil 48 remaining deenergized and the normally open contacts 50 remaining open.

Upon the release of the contactor 60, the relay coil 24 remains energized and the bias on the base of the transistor 34 remains as previously described but the bias on the emitter electrode of the transistor 34 is removed and the emitter electrode is grounded through the resistor 36. It will be noted that the diode 58 prevents the potential of the DC power supply 16 from being supplied to the emitter electrode through the normally open contacts 26. When the bias is removed from the emitter electrode of the transistor 34, the transistor 34 is biased into conduction which in turn biases the transistor 40 into conduction. Conduction of the transistor 40 applies the potential of the DC power source 16 to the relay coil 48 through the diode 44, the relay coil being energized thereby to close the set of normally open contacts 50. In this manner, the transistors 34 and 40 and their associated circuitry serve as a gate to energize the relay coil 48 when the relay coil 24 is energized and the contactor 60 is in its neutral or open position. The diodes 46 and 58 prevent the potential of the DC power source 16 from being supplied through the diode 51 to the base electrode of the transistor 18.

The closure of the set of normally open contacts 50 connects the terminal 56 of the push button to the base electrode of the transistor 18 through the diode 51. As long as the contactor 60 remains in its neutral position, the speed control system will maintain the vehicle at the desired speed.

When it is desired to deenergize the speed control circuit, the contactor 60 is moved to its actuated position to engage the contacts 54 and 56. The output of the DC power supply 16 is thereby applied to the base electrode of the transistor 18 through the set of normally open contacts 50 and the diode 51 to bias the transistors 18 and 20 into nonconduction. Nonconduction of the transistors 18 and 20 inhibits the relay coil 24, as previously described, which is deenergized to open the normally open contacts 26 and disconnect the speed control circuit 12 from the power source 16. The speed control circuit 12 is thereafter ineffective to control the vehicle speed.

While the contactor 60 is in its actuated position, the transistors 34 and 40 are biased into nonconduction due to the bias on the emitter electrode of the transistor 34. To prevent the relay coil 48 from becoming deenergized and opening the set of normally open contacts 50 and the resulting reenergization of the relay coil 24, the diode 46 is provided to supply the output of the DC power source 16 to the relay coil 48 through the now closed set of normally open contacts 50 to maintain the relay coil 48 energized while the contactor 60 is actuated. When the contactor 60 is allowed to return to its neutral position, the relay coil 48 is then deenergized and the circuit is returned to its initial condition. A subsequent actuation of the contactor 60 will again energize and latch the relay coil 24 if the vehicle speed is above the predetermined minimum speed as previously indicated.

If, while the vehicle speed is being controlled, the vehicle brakes are actuated to open the brake switch 32, the relay coils 24 and 48 will be deenergized and the circuit returned to its original condition with the speed control circuit being deenergized. As can be seen, a subsequent actuation of the push button 52 will again reenergize the speed control circuit in the manner previously described.

Although the electronic push button sequencer is described with reference to a speed control system, it is not limited thereto. As can be seen, if the base electrode of the transistor 18 is grounded through a resistor, the electronic push button sequencer may be used to selectively disconnect or connect a power supply to a load by actuation of the push button 52.

The detailed description of the preferred embodiment of the invention for the purpose of explaining the principles thereof is not to be considered as limiting or restricting the invention, since many modifications may be made by the exercise of skill in the art without departing from the scope of the invention.

We claim:

1. An electronic sequencing circuit comprising a power supply; a load; a pulse generator coupled to the power supply for generating an output comprised of pulses of power; a series circuit including a normally conducting enabling element having a control electrode responsive to power applied thereto for shifting the enabling element to a nonconducting state during the time duration of said applied power and a first control element energized by power applied thereacross; latching means coupled to the power supply, the load and the first control element and responsive to the energization of the first control element for coupling the load and the series circuit across the power supply to maintain the first control element energized and to supply power to the load; means for coupling the pulses of power across the series circuit to energize the first control element therein when the normally conducting enabling element is conducting; a second control element energized by power applied thereacross; gate means coupled to the power supply, the first control element and the pulse generator for coupling the power supply across the second control element during the absence of a pulse of power from the pulse generator while the first control element is energized; means coupled to the pulse generator, the second control element and the control electrode of the normally conducting enabling element and responsive to the energization of the second control element for applying the output of the pulse generator across said second control element and to said control electrode, the normally conducting enabling element being shifted to its nonconducting state for the duration of one of the pulses of power applied thereto from the last mentioned means to deenergize the first control element and the second control element being deenergized upon the termination of said pulse of power, whereby the load is cyclically coupled and decoupled from across the power supply by the pulses of power generated by the pulse generator.

2. An electronic sequencing circuit comprising a power supply; a load; a manually operable switch means coupled to the power supply for coupling the power supply to an output terminal thereof when said manually operable switch means is operated; a series circuit including a transistor normally biased into conduction and a first relay coil energized by power applied thereacross, said transistor having a control electrode responsive to power applied thereto for biasing the transistor into nonconduction; first normally open relay contacts coupled to the power supply, the load and the first relay coil and responsive to the energization of the first relay coil for coupling the load and the series circuit across the power supply to maintain the first relay coil energized and to supply power to the load; means for coupling the output terminal of the manually operable switch means to the series circuit to energize the first relay coil therein when the transistor is biased into conduction; a second relay coil energized by power applied thereacross; gate means coupled to the power supply, the first relay coil and the manually operable switch means for coupling the power supply across the second relay coil during the time period when the manually operable switch means is released while the first relay coil is energized; second normally open relay contacts coupled to the output terminal of the manually operable switch means, the second relay coil and the control electrode of the transistor and responsive to the energization of the second relay coil for coupling the output terminal of the manually operable switch means to the second relay coil and to said control electrode, the transistor being biased to nonconduction upon the operation of the manually operable switch means for the duration that said switch means is operated to deenergize the first relay coil and the second relay coil being maintained energized upon the operation of the manually operable switch means and being deenergized when said switch means is released, whereby the load is cyclically coupled and decoupled from across the power supply upon repeated actuations of the manually operable switch means.

* * * * *

PO-1050
(5/69)

UNITED STATES PATENT OFFICE
CERTIFICATE OF CORRECTION

Patent No. __3,702,424__    Dated __November 7, 1972__

Inventor(s) __Ronald L. Colling and Myron U. Trenne__

It is certified that error appears in the above-identified patent and that said Letters Patent are hereby corrected as shown below:

In the cover page, change the Assignee from "General Electric Corporation" to -- General Motors Corporation --.

Column 4, line 2, "push button to the base" should read -- push button switch 52 to the base --.

Signed and sealed this 17th day of April 1973.

(SEAL)
Attest:

EDWARD M. FLETCHER, JR.
Attesting Officer

ROBERT GOTTSCHALK
Commissioner of Patents